(12) United States Patent  
Genardo

(10) Patent No.: US 6,318,017 B1
(45) Date of Patent: Nov. 20, 2001

(54) FISHING ROD HOLDER APPARATUS

(76) Inventor: Anthony P. Genardo, R.D. 1, Box 112 Roses Brook Rd., South Kortright, NY (US) 13842

( * ) Notice: Subject to any disclaimer, the term of this patent is extended or adjusted under 35 U.S.C. 154(b) by 0 days.

(21) Appl. No.: 09/436,125

(22) Filed: Nov. 8, 1999

Related U.S. Application Data

(60) Provisional application No. 60/107,603, filed on Nov. 9, 1998.

(51) Int. Cl.$^7$ ................................................ A01K 97/10
(52) U.S. Cl. .................................................. 43/21.2
(58) Field of Search ........................... 43/21.2; 248/530, 248/532, 533

(56) References Cited

U.S. PATENT DOCUMENTS

| | | |
|---|---|---|
| 1,577,612 | 3/1926 | Dees . |
| 2,211,278 * | 8/1940 | LeFebvre ............................... 248/532 |
| 2,311,823 * | 2/1943 | Gaskill ................................... 248/530 |
| 2,414,358 | 1/1947 | Calway . |
| 2,612,334 | 9/1952 | Delamere . |
| 3,021,101 * | 2/1962 | Gliebe .................................... 43/21.2 |
| 3,182,937 * | 5/1965 | Manning ................................ 248/533 |
| 3,259,346 * | 7/1966 | Rogers ................................... 248/532 |
| 3,309,808 * | 3/1967 | George ...................................... 43/15 |
| 3,339,869 | 9/1967 | Andersen . |
| 3,903,633 * | 9/1975 | Hutcherson ................................ 43/17 |
| 3,924,345 * | 12/1975 | Sapp ....................................... 43/21.2 |
| 4,443,963 * | 4/1984 | Braaten ................................. 43/21.2 |
| 4,658,534 | 4/1987 | McClean . |
| 4,748,762 * | 6/1988 | Campbell .............................. 43/21.2 |

* cited by examiner

*Primary Examiner*—Kurt Rowan

(57) ABSTRACT

A fishing rod holder apparatus includes a tubular handle receiver unit which includes a top receiver end and a bottom receiver end. The bottom receiver end has a bottom internal diameter. A ground penetration spike assembly is connected to the bottom receiver end and includes a spike retention member and a spike retained by the spike retention member. The spike retention member has an external member diameter which is less than the bottom internal diameter of the handle receiver unit. The handle receiver unit has a longitudinal receiver unit length. The ground penetration spike assembly has a longitudinal spike assembly length, and the receiver unit length is greater than the spike assembly length. The apparatus is used in either of two modes: a ground penetration mode in with a fishing rod handle is inserted into the handle receiver unit, whereby the fishing rod is supported; and a storage mode in which the ground penetration spike assembly is stored within the handle receiver unit. The handle receiver unit includes a tube member, and a coupler member is connected to a bottom end of the tube member. The coupler member includes an inner ring-shaped stop member located between a tube member reception portion and a spike assembly reception portion. The tube member is fitted into the tube member reception portion. The spike assembly reception portion of the coupler member is internally threaded with internal threads. A hook assembly is connected to the tube member of the handle receiver unit.

5 Claims, 3 Drawing Sheets

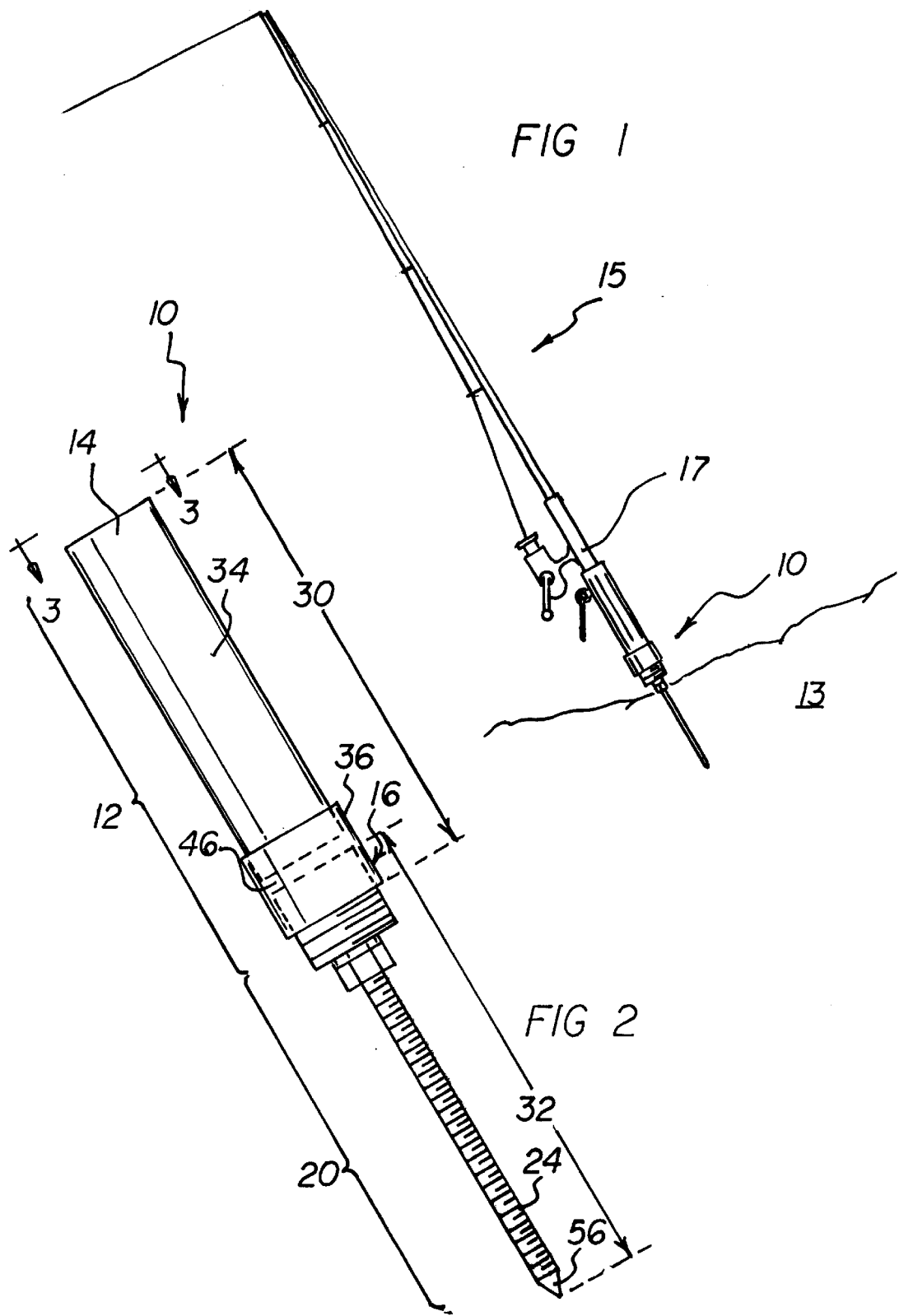

FISHING ROD HOLDER APPARATUS

CROSS REFERENCE TO RELATED APPLICATION

This application claims priority based upon my Provisional Application Ser. No. 60/107,603, filed Nov. 9, 1998.

BACKGROUND OF THE INVENTION

1. Field of the Invention

The present invention relates generally to holders for fishing poles and, more particularly, to fishing pole holders that are supported on the ground by a ground-penetrating member.

2. Description of the Prior Art

Fishing pole holders that are supported on the ground by a ground-penetrating member are well known in the art. In this respect, throughout the years, a number of innovations have been developed relating to such ground-supported fishing pole holders, and the following U.S. patents are representative of some of those innovations: U.S. Pat. Nos. 1,577,612, 2,414,358, 2,612,334, 3,339,869, and 4,658,534. More specifically, U.S. Pat. No. 1,577,612 discloses a fishing pole support having a ground-penetrating member that is unscrewed from a tubular pole-handle receiver and stored therein when the fishing pole support is not being used to support a fishing pole. It is noted that the ground-penetrating member is disassembled and stored as two independent components inside the tubular pole-handle receiver. As a result, the components of the ground-penetrating member can move and rattle inside the pole-handle receiver during storage. Such movement and rattling can be annoying. In this respect, it would be desirable if a fishing rod holder apparatus were provided that st a ground-penetrating member when not in use in such a way that the stored ground-penetrating member does not move or rattle inside the storage space.

U. S. Pat. No. 2,414,358 discloses a fishing rod holder apparatus that has a ground-penetrating member that is not retained inside a tubular pole-handle receiver when the ground-penetrating member is not in the ground. Such an unprotected ground-penetrating member can be dangerous. It's sharp point can cause a person to be cut or can cause articles surrounding a stored fishing rod holder apparatus to be poked or punctured. In this respect, it would be desirable if a fishing rod holder apparatus were provided that st a ground-penetrating member in such a way that it will not poke or puncture or cut persons or articles that come into contact with a stored fishing rod holder apparatus.

U.S. Pat, No. 2,612,334 discloses a fishing rod holder apparatus that includes a tubular pole-handle receiver that has a slot in its side for guiding movement of a ground-penetrating member therein. Edges of such a slot are susceptible to damage, and dirt can enter the tubular pole-handle receiver through the slot. In this respect, it would be desirable if a fishing rod holder apparatus were provided that does not have a slot in the tubular pole-handle receiver.

U. S. Pat. No. 3,339,869 discloses a fishing rod holder apparatus that includes a ground-penetrating member that is in a form of a thin, shell-like concave blade. Such a blade is relatively weak compared to a solid cylindrical spike for a ground-penetrating member. In this respect, it would be desirable if a fishing rod holder apparatus were provided that included a ground-penetrating member that is in a form of a cylindrical spike.

U.S. Pat. No. 4,658,534 discloses a fishing rod holder apparatus that includes a ground-penetrating member that is in a form of a cylindrical spike. The spike includes external threads that are screwed into a sleeve that is inserted inside a tubular pole-handle receiver. When a fishing pole handle is supported by the tubular pole-handle receiver, the fishing pole handle comes in direct contact with head portion of the spike. To prevent a fishing pole handle from be soiled by direct contact with a head of a ground-penetrating spike, it would be desirable if a fishing rod holder apparatus were provided which keeps the fishing pole handle from coming in direct contact with the ground-penetrating member. Furthermore, rather than having a sleeve that receives the ground-penetrating member from being inserted into the tubular pole-handle receiver, it would be desirable for a coupler member located between the tubular pole-handle receiver and the ground-penetrating member to be connected to an outside portion of a bottom end of the tubular pole-handle receiver. An internal sleeve takes up space that would otherwise be available to the handle of the fishing pole.

Thus, while the foregoing body of prior art indicates it to be well known to use fishing rod holder apparatuses, the prior art described above does not teach or suggest a fishing rod holder apparatus which has the following combination of desirable features: (1) st a ground-penetrating member when not in use in such a way that the stored ground-penetrating member does not move or rattle inside the storage space; (2) st a ground-penetrating member in such a way that it will not poke or puncture or cut persons or articles that come into contact with a stored fishing rod holder apparatus; (3) does not have a slot in the tubular pole-handle receiver; (4) includes a ground-penetrating member that is in a form of a cylindrical spike; (5) keeps a fishing pole handle from coming in direct contact with the ground-penetrating member; and (6) provides a coupler member located between the tubular pole-handle receiver and the ground-penetrating member that is connected to an outside portion of a bottom end of the tubular pole-handle receiver. The foregoing desired characteristics are provided by the unique fishing rod holder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fishing rod holder apparatus which includes a tubular handle receiver unit which includes a top receiver end and a bottom receiver end. The bottom receiver end has a bottom internal diameter. A ground penetration spike assembly is connected to the bottom receiver end. The ground penetration spike assembly includes a spike retention member and a spike retained by the spike retention member. The spike retention member has an external member diameter which is less than the bottom internal diameter of the handle receiver unit. The handle receiver unit has a longitudinal receiver unit length. The ground penetration spike assembly has a longitudinal spike assembly length, and the receiver unit length is greater than the spike assembly length. The apparatus is used in either of two modes: a ground-penetration mode in with a fishing rod handle is inserted into the handle receiver unit, whereby the fishing rod is supported; and a storage mode in which the ground penetration spike assembly is stored within the handle receiver unit.

The handle receiver unit includes a tube member, and a coupler member is connected to a bottom end of the tube member. The coupler member includes an inner ring-shaped stop member located between a tube member reception portion and a spike assembly reception portion. The tube member is fitted into the tube member reception portion. The spike assembly reception portion of the coupler member is internally threaded with internal threads. The spike is in a form of a threaded bolt has a bolt head and a sharpened point.

A book assembly is connected to the tube member of the handle receiver unit. The handle receiver unit includes an internally threaded aperture for receiving an externally threaded attachment member of the hook assembly.

The ground penetration spike assembly includes the spike retention member which includes external threads and an interior bolt reception channel. A first lock washer is located between the bolt head and the spike retention member. A second lock washer is located on the spike distal to the first lock washer, and a lock nut adjacent to the second lock washer on the spike.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing rod holder apparatus which has all of the advantages of the prior art and none of the disadvantages.

It is another object of the present invention to provide a new and improved fishing rod holder apparatus which may be easily and efficiently manufactured and marketed.

It is a further object of the present invention to provide a new and improved fishing rod holder apparatus which is of durable and reliable construction.

An even further object of the present invention is to provide a new and improved fishing rod holder apparatus which is susceptible of a low cost of manufacture with regard to both materials and labor, and which accordingly is then susceptible of low prices of sale to the consuming public, thereby making such fishing rod holder apparatus available to the buying public.

Still yet a further object of the present invention is to provide a new and improved fishing rod holder apparatus which st a ground-penetrating member when not in use in such a way that the stored ground-penetrating member does not move or rattle inside the storage space.

Still another object of the present invention is to provide a new and improved fishing rod holder apparatus that st a ground-penetrating member in such a way that it will not poke or puncture or cut persons or articles that come into contact with a stored fishing rod holder apparatus.

Yet another object of the present invention is to provide a new and improved fishing rod holder apparatus which does not have a slot in the tubular pole-handle receiver.

Even another object of the present invention is to provide a new and improved fishing rod holder apparatus that includes a ground-penetrating member that is in a form of a cylindrical spike.

Still a further object of the present invention is to provide a new and improved fishing rod holder apparatus which keeps a fishing pole handle from coming in direct contact with the ground-penetrating member.

Yet another object of the present invention is to provide a new and improved fishing rod holder apparatus that provides a coupler member located between the tubular pole-handle receiver and the ground-penetrating member that is connected to an outside portion of a bottom end of the tubular pole-handle receiver.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view showing a preferred embodiment of the fishing rod holder apparatus of the invention in use, supported by the ground, and supporting a fishing rod by holding the fishing rod handle.

FIG. 2 is an enlarged side view of the embodiment of the fishing rod holder apparatus shown in FIG. 1 with the fishing rod handle removed therefrom and with the apparatus in a ground-penetration mode.

DESCRIPTION OF THE PREFERRED EMBODIMENT

Figure 3:
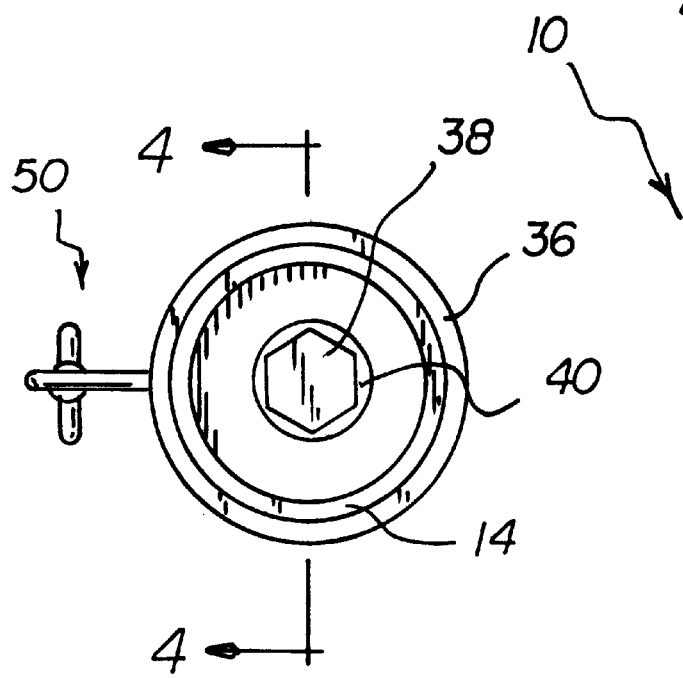
FIG. 3 is an enlarged top view of the embodiment of the invention shown in FIG. 2 taken along line 3—3 thereof.

With reference to the drawings, a new and improved fishing rod holder apparatus embodying the principles and concepts of the present invention will be described.

Turning to FIGS. 1–5, there is shown an exemplary embodiment of the fishing rod holder apparatus of the invention generally designated by reference numeral 10. In its preferred form, fishing rod holder apparatus 10 includes a tubular handle receiver unit 12 which includes a top receiver end 14 and a bottom receiver end 16. The bottom receiver end generally indicated by reference sign 16 has a bottom internal diameter 18. A ground penetration spike assembly 20 is connected to the bottom receiver end 16. The ground penetration spike assembly 20 includes a spike retention member 22 and a spike 24 retained by the spike retention member 22. The spike retention member 22 has an external member diameter 26 which is less than the bottom internal diameter 18 of the handle receiver unit 12. The handle receiver unit 12 has a longitudinal receiver unit length 30. The ground penetration spike assembly 20 has a longitudinal spike assembly length 32, and the receiver unit length 30 is greater than the spike assembly length 32.

The handle receiver unit 12 includes a tube member 34. Coupler member 36 defines the bottom receiver end 16 of tubular handle receiver unit 12, and a coupler member 36 connected to an outside portion of a bottom end of the tube member 34. The coupler member 36 includes an inner ring-shaped stop member 46 located between a tube member reception portion 47 and a spike assembly reception portion. The tube member 34 is fitted into the tube member reception portion 47. The tube member 34 is secured to the tube member reception portion 47 by either a friction fit or by an adhesive. The spike assembly reception portion of the coupler member 36 is internally threaded with internal threads 54. The spike 24 is in a form of a threaded bolt has a bolt head 38 and a sharpened point 56.

A hook assembly 50 is connected to the tube member 34 of the handle receiver unit 12. The handle receiver unit 12 includes an internally threaded aperture 49 for receiving an externally threaded attachment member 48 of the hook assembly 50. The ground penetration spike assembly 20 includes the spike retention member 22 which includes external threads 52 and an interior bolt reception channel 58. A first lock washer 40 is located between the bolt head 38 and the spike retention member 22. A second lock washer 42 is located on the spike 24 distal to the first lock washer 40, and a lock nut 44 is located adjacent to the second lock washer 42 on t he spike 24.

To assemble the ground penetration spike assembly 20, the first lock washer 40 is threaded onto the spike 24, and the spike 24 is screwed into the bolt reception channel 58 of the spike retention member 22. When the point 56 of the spike 24 emerges from the spike retention member 22, the second lock washer 42 is threaded onto the spike 24. Then, the lock nut 44 is screwed onto the spike 24. When the spike 24 is fully installed in the spike retention member 22, the first lock washer 40, the spike retention member 22, and the second lock washer 42 are sandwiched between the bolt head 38 and the lock nut 44 thereby forming the fully assembled ground penetration spike assembly 20.

Figure 4:
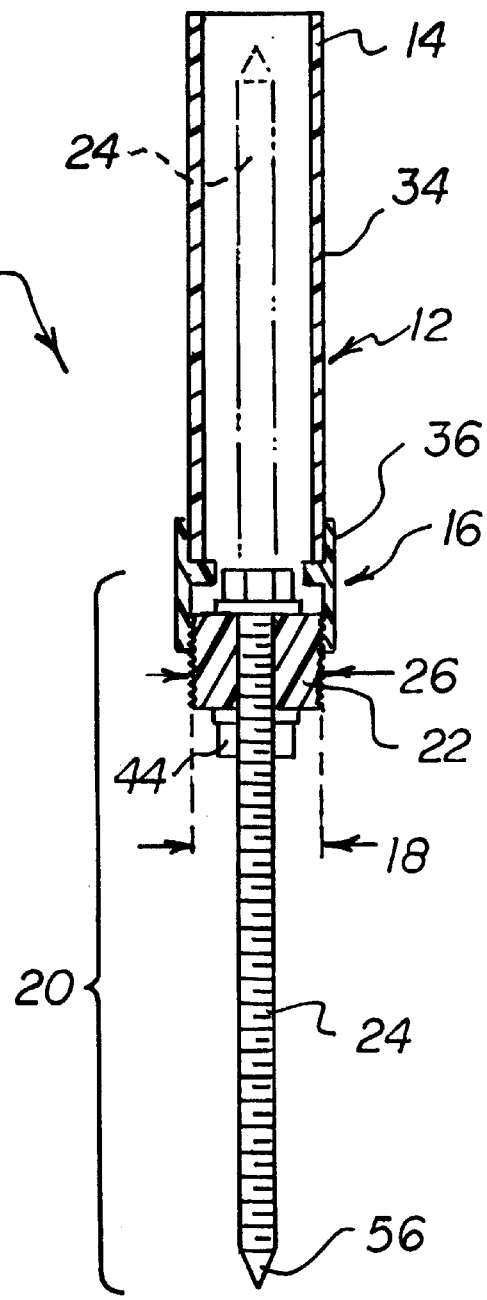
FIG. 4 is a cross-sectional view of the embodiment of the invention shown in FIG. 3 taken along line 4—4 thereof, wherein a storage mode is shown in broken lines.
Figure 5:
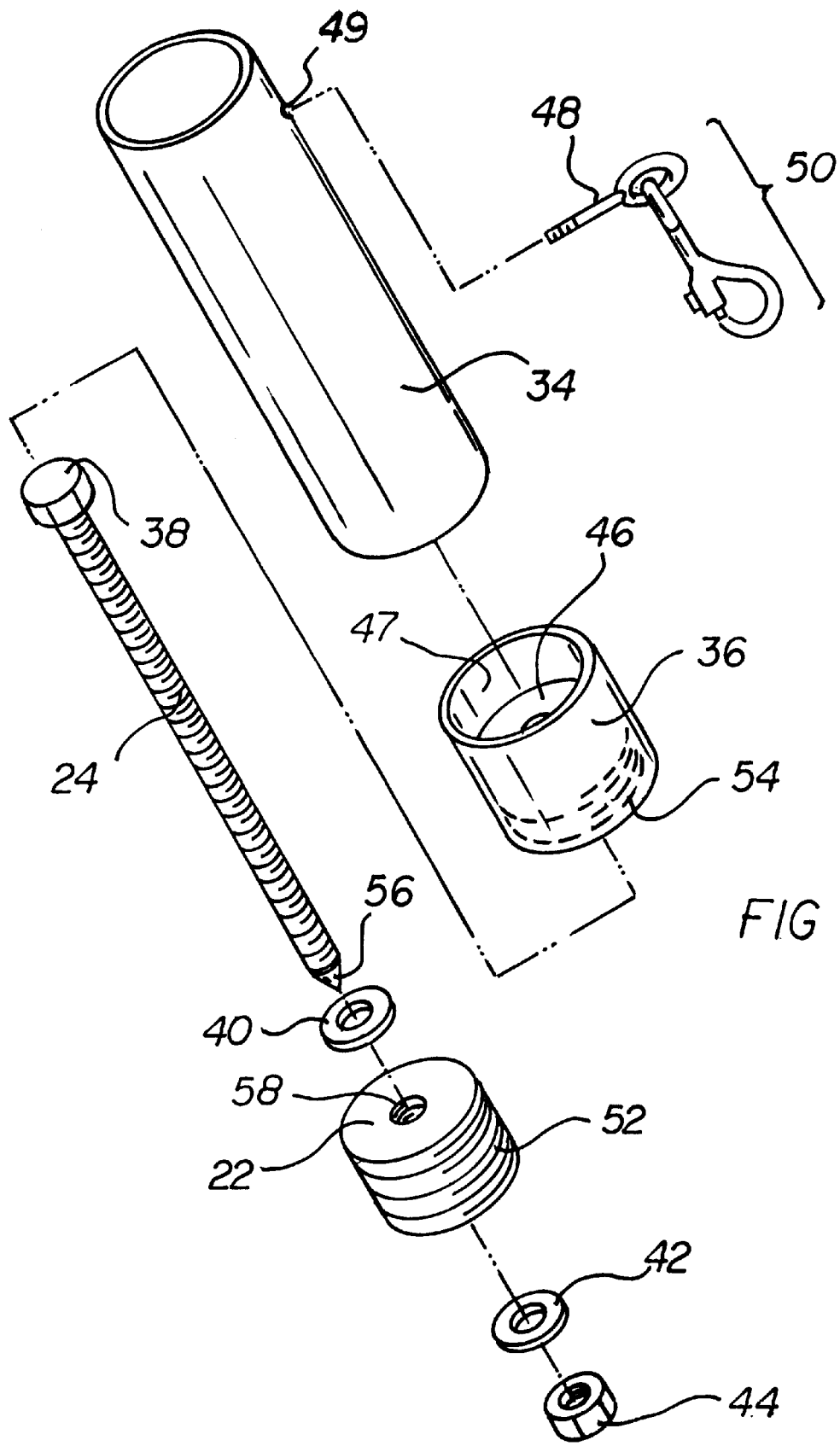
FIG. 5 is an exploded perspective view of the embodiment of the invention shown in FIGS. 1–4.

The fishing rod holder apparatus 10 is used in either of two modes: a ground-penetration mode shown in FIGS. 1, 2, and the unbroken lines in FIG. 4; and a storage mode shown in the broken lines of FIG. 4. More specifically, in the ground-penetration mode, the external threads 52 of the spike retention member 22 are screwed into the internal threads 54 of the coupler member 36. The spike retention member 22 is screwed into the coupler member 36 so that the top of the spike retention member 22 forms a tight fit on the inner ring-shaped stop member 46. As shown in FIG. 1, the spike 24 is driven into the ground 13, and the fishing rod handle 17 of the fishing rod 15 is inserted into the tube member 34 of the handle receiver unit 12. In this way, the fishing rod 15 is held in the fishing rod holder apparatus 10 of the invention.

On the other hand, as illustrated with the broken lines in FIG. 4, when the fishing rod holder apparatus 10 of the invention is in the storage mode, the top of the spike retention member 22 is unscrewed from the internal threads 54 of the coupler member 36. Then, the point 56 of the spike 24 is threaded through the inner ring-shaped stop member 46 so that the spike 24 extends into the interior of the tube member 34. Then, the bottom of the spike retention member 22 is screwed into the internal threads 54 so that the bottom of the spike retention member 22 rests up against the inner ring-shaped stop member 46. When this is done, the ground penetration spike assembly 20 is secured in the handle receiver unit 12 so that the tube member 34 shields the spike 24 contacting any exterior object when the ground penetration spike assembly 20 is in the storage mode. Since the receiver unit length 30 is longer than the spike assembly length 32, the spike 24 is fully shielded by the tube member 34 and does stick out therefrom.

Although dimensions can vary in innumerable ways, the tube member 34 can be made from a 6 inch length of 1½ inch diameter PVC pipe. The coupler member 36 can be made from a 1½ inch female PVC adaptor. The spike 24 can be made from a 5½ inch threaded bolt.

The use of the hook assembly 50 permits the fishing rod holder apparatus 10 to be hooked onto an object that is carried, such as a tackle box, or permits the fishing rod holder apparatus 10 to be hooked onto an article of the fisherman's clothing.

The components of the fishing rod holder apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fishing rod holder apparatus that is low in cost, relatively simple in design and operation, and which may advantageously be used to store a ground-penetrating member when not in use in such a way that the stored ground-penetrating member does not move or rattle inside the storage space. With the invention, a fishing rod holder apparatus is provided which st a ground-penetrating member in such a way that it will not poke or puncture or cut persons or articles that come into contact with a stored fishing rod holder apparatus. With the invention, a fishing rod holder apparatus is provided which does not have a slot in the tubular pole-handle receiver. With the invention, a fishing rod holder apparatus is provided which includes a ground penetrating member that is in a form of a cylindrical spike. With the invention, a fishing rod holder apparatus is provided which keeps a fishing pole handle from coming in direct contact with the ground-penetrating member. With the invention, a fishing rod holder apparatus provides a coupler member located between the tubular pole-handle receiver and the ground-penetrating member that is connected to an outside portion of a bottom end of the tubular pole-handle receiver.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A fishing rod holder apparatus, comprising:
    a tubular handle receiver unit which includes a top receiver end and a bottom receiver end, wherein said bottom receiver end has a bottom internal diameter,
    a ground penetration spike assembly connected to said bottom receiver end, wherein said ground penetration spike assembly includes a spike retention member and a spike retained by said spike retention member, wherein said spike retention member has an external member diameter which is less than said bottom internal diameter of said bottom receiver end,
    wherein said tubular handle receiver unit has a longitudinal receiver unit length, said ground penetration spike assembly has a longitudinal spike assembly length, and said receiver unit length is greater than said spike assembly length,
    wherein said tubular handle receiver unit includes a tube member and a coupler member connected to a bottom end portion of said tube member, said coupler member defining said bottom receiver end of said tubular handle receiving unit, and
    wherein said coupler member includes a tube member reception portion and a spike assembly reception portion, and
    an inner ring-shaped stop member located between said tube member reception portion and said spike assembly reception portion,
    wherein said spike is in a form of a threaded bolt having a bolt head and a sharpened point, and
    wherein said ground penetration spike assembly includes:
        said spike retention member which includes external threads and an interior bolt reception channel,
        a first lock washer between said bolt head and said spike retention member,
        a second lock washer distal to said first lock washer, and
        a lock nut adjacent to said second lock washer on said spike.

2. The apparatus of claim 1 wherein said tube member is fitted into said tube member reception portion of said coupler member.

3. The apparatus of claim 1 wherein said spike assembly reception portion of said coupler member is internally threaded with internal threads.

4. The apparatus of claim 1, further including:
    a hook assembly connected to said tube member of said handle receiver unit.

5. The apparatus of claim 4 wherein said handle receiver unit includes an internally threaded aperture for receiving an externally threaded attachment member of said hook assembly.

* * * * *